United States Patent
Richter et al.

(10) Patent No.: US 7,981,534 B2
(45) Date of Patent: Jul. 19, 2011

(54) RECHARGEABLE BATTERY WITH FLEXIBLY CONNECTED VENT PLUGS

(75) Inventors: Gerolf Richter, Hildesheim (DE); Peter Streuer, Hannover (DE)

(73) Assignee: VB Autobatterie GmbH & Co. KGaA, Hannover (DE)

( * ) Notice: Subject to any disclaimer, the term of this patent is extended or adjusted under 35 U.S.C. 154(b) by 1164 days.

(21) Appl. No.: 11/388,184

(22) Filed: Mar. 23, 2006

(65) Prior Publication Data

US 2006/0234114 A1 Oct. 19, 2006

(30) Foreign Application Priority Data

Apr. 15, 2005 (DE) .......................... 10 2005 017 442

(51) Int. Cl.
*H01M 2/12* (2006.01)
(52) U.S. Cl. ............................... 429/89; 429/82; 429/87
(58) Field of Classification Search .................... None
See application file for complete search history.

(56) References Cited

U.S. PATENT DOCUMENTS

| | | | |
|---|---|---|---|
| 1,469,119 A | 9/1923 | Stallings | |
| 1,692,316 A | 11/1928 | Smith | |
| 1,905,319 A | 4/1933 | Sturges | |
| 2,182,492 A | 12/1939 | Hall | |
| 2,222,412 A | 11/1940 | King | |
| 2,287,802 A | 6/1942 | Hill | |
| 2,452,066 A | 10/1948 | Murphy | |
| 2,530,539 A | 11/1950 | Raney et al. | |
| 2,713,953 A | 7/1955 | Jewell | |
| 2,737,542 A | 3/1956 | Shannon et al. | |
| 2,912,999 A | 11/1959 | Kersh | |
| 2,942,055 A | 6/1960 | Doyle et al. | |
| 3,124,488 A | 3/1964 | Ruetschi | |
| 3,170,819 A | 2/1965 | Abramson | |
| 3,242,012 A | 3/1966 | Sabatino | |
| 3,262,719 A | 7/1966 | Shannon | |
| 3,394,035 A | 7/1968 | Cox et al. | |
| 3,441,448 A | 4/1969 | Hayward et al. | |
| 3,484,301 A | 12/1969 | Gray | |
| 3,508,972 A | 4/1970 | Goldingay | |

(Continued)

FOREIGN PATENT DOCUMENTS

DE 1 903 641 9/1969

(Continued)

OTHER PUBLICATIONS

PCT International Search Report for PCT/US99/03987, date of mailing, Jul. 29, 1999, 3 pages.

*Primary Examiner* — Keith Walker
(74) *Attorney, Agent, or Firm* — Lathrop & Clark LLP (57) ABSTRACT

A rechargeable battery includes a housing, a plurality of cells within the housing, and a cover which closes the housing. The battery also includes a plurality of filling openings arranged in the cover separated from one another by a distance and a plurality of plugs. Each of the plurality of plugs is configured to close one of the plurality of filling openings. A flexible connecting element connects at least two of the plugs. The flexible connecting element is configured such that the distance between the plugs which are connected to one another can be variably matched to the distance between their associated filling openings by rotating at least one of the plugs connected by the flexible connecting element.

10 Claims, 6 Drawing Sheets

U.S. PATENT DOCUMENTS

| | | | |
|---|---|---|---|
| 3,597,280 A | 8/1971 | Hennen | |
| 3,600,232 A | 8/1971 | Daguenet | |
| 3,601,152 A | 8/1971 | Kenworthy | |
| 3,604,451 A | 9/1971 | Delamater | |
| 3,630,788 A | 12/1971 | Hennen | |
| 3,723,188 A | 3/1973 | Hennen | |
| 3,778,314 A | 12/1973 | Kano et al. | |
| 3,825,444 A | 7/1974 | Martin | |
| 3,841,915 A | 10/1974 | Eberle | |
| 3,846,178 A | 11/1974 | Evjen et al. | |
| 3,879,227 A | 4/1975 | Hennen | |
| 3,915,753 A | 10/1975 | Melokne | |
| 3,944,437 A | 3/1976 | Auerback | |
| 3,988,169 A | 10/1976 | McLean | |
| 4,009,322 A | 2/1977 | Wolf | |
| 4,029,855 A | 6/1977 | Dougherty et al. | |
| 4,052,534 A | 10/1977 | Devitt | |
| 4,063,007 A | 12/1977 | Spiegelberg | |
| 4,064,725 A | 12/1977 | Hug et al. | |
| 4,086,394 A | 4/1978 | Tesch | |
| 4,086,395 A | 4/1978 | Heiser et al. | |
| 4,087,592 A | 5/1978 | Okazaki et al. | |
| 4,091,180 A | 5/1978 | Fox et al. | |
| 4,098,963 A | 7/1978 | Mocas | |
| 4,107,398 A | 8/1978 | Lindenberg et al. | |
| 4,117,205 A | 9/1978 | Kitai | |
| 4,189,033 A | 2/1980 | Katsumori | |
| 4,207,387 A | 6/1980 | Jutte | |
| 4,212,179 A | 7/1980 | Juergens | |
| 4,219,612 A * | 8/1980 | Tatlock | 429/86 |
| 4,233,370 A | 11/1980 | Heiser et al. | |
| 4,276,360 A | 6/1981 | Hardigg et al. | |
| 4,278,742 A | 7/1981 | Oxenreider et al. | |
| 4,306,002 A | 12/1981 | Heiser et al. | |
| 4,328,290 A | 5/1982 | Szymborski et al. | |
| 4,338,383 A | 7/1982 | Jutte et al. | |
| 4,346,151 A | 8/1982 | Uba et al. | |
| 4,348,466 A | 9/1982 | Elehew et al. | |
| 4,371,591 A | 2/1983 | Oxenreider et al. | |
| 4,374,187 A | 2/1983 | Sano | |
| 4,383,011 A | 5/1983 | McClelland et al. | |
| 4,394,423 A | 7/1983 | Ledjeff | |
| 4,409,302 A | 10/1983 | Poe | |
| 4,421,832 A | 12/1983 | Uba | |
| 4,447,508 A | 5/1984 | Jensen | |
| 4,460,661 A | 7/1984 | Sköld | |
| 4,460,663 A | 7/1984 | Stutzbach et al. | |
| 4,463,069 A | 7/1984 | Greenlee | |
| 4,562,126 A | 12/1985 | Chartrain et al. | |
| 4,565,750 A * | 1/1986 | Isoi et al. | 429/72 |
| 4,576,879 A | 3/1986 | Nakazawa et al. | |
| 4,606,982 A | 8/1986 | Nelson et al. | |
| 4,613,550 A | 9/1986 | Jergl et al. | |
| 4,637,966 A | 1/1987 | Uba et al. | |
| 4,648,177 A | 3/1987 | Uba et al. | |
| 4,742,611 A | 5/1988 | Meadows et al. | |
| 4,751,154 A | 6/1988 | Binder et al. | |
| 4,756,982 A | 7/1988 | McCartney, Jr. et al. | |
| 4,778,735 A | 10/1988 | Shestok et al. | |
| 4,780,378 A | 10/1988 | McCartney, Jr. et al. | |
| 4,780,379 A | 10/1988 | Puester | |
| 4,800,142 A | 1/1989 | Bish et al. | |
| 4,851,305 A | 7/1989 | Kump et al. | |
| 4,916,034 A | 4/1990 | Huselbus et al. | |
| 5,091,273 A | 2/1992 | Hug et al. | |
| 5,120,620 A | 6/1992 | Nelson et al. | |
| 5,128,218 A | 7/1992 | Tokunaga et al. | |
| 5,132,175 A | 7/1992 | Mrotek et al. | |
| 5,162,164 A | 11/1992 | Dougherty et al. | |
| 5,181,936 A | 1/1993 | Meadows | |
| 5,206,987 A | 5/1993 | Mix | |
| 5,212,025 A | 5/1993 | Shibata et al. | |
| 5,217,823 A | 6/1993 | Geibl et al. | |
| 5,278,003 A | 1/1994 | Francisco | |
| 5,281,492 A | 1/1994 | Lin | |
| 5,283,137 A | 2/1994 | Ching | |
| 5,284,720 A | 2/1994 | Theurk et al. | |
| 5,352,545 A | 10/1994 | Furukawa et al. | |
| 5,380,604 A | 1/1995 | Hampe et al. | |
| 5,415,956 A | 5/1995 | Ching | |
| 5,424,146 A | 6/1995 | Lin | |
| 5,464,701 A | 11/1995 | Rey | |
| 5,498,488 A | 3/1996 | Stocchiero | |
| 5,549,986 A | 8/1996 | Heiman et al. | |
| 5,561,001 A | 10/1996 | Gurtler et al. | |
| 5,565,282 A | 10/1996 | Feres et al. | |
| 5,599,641 A | 2/1997 | Ching, Jr. et al. | |
| 5,663,010 A | 9/1997 | Stocchiero | |
| 5,665,483 A | 9/1997 | Saito et al. | |
| 5,674,640 A | 10/1997 | Mrotek et al. | |
| 5,688,612 A | 11/1997 | Mrotek et al. | |
| 5,691,076 A | 11/1997 | Poe | |
| 5,702,841 A | 12/1997 | Thomas et al. | |
| 5,856,037 A | 1/1999 | Casale et al. | |
| 5,871,862 A | 2/1999 | Olson | |
| 6,025,086 A | 2/2000 | Ching | |
| 6,040,079 A | 3/2000 | Mcmurren | |
| 6,071,642 A | 6/2000 | Pospiech et al. | |
| 6,087,038 A | 7/2000 | Flament et al. | |
| 6,143,438 A | 11/2000 | Geibl et al. | |
| 6,277,517 B1 | 8/2001 | Thomas et al. | |
| 6,461,758 B1 | 10/2002 | Geibl et al. | |
| 6,733,921 B2 | 5/2004 | Richter et al. | |
| 6,866,962 B2 | 3/2005 | Bechtold et al. | |

FOREIGN PATENT DOCUMENTS

| | | |
|---|---|---|
| DE | 1 905 215 | 8/1970 |
| DE | 1 906 191 | 8/1970 |
| DE | 1671799 A | 3/1972 |
| DE | 2419847 A1 | 12/1974 |
| DE | 9312250 U1 | 10/1993 |
| DE | 42 32 961 | 4/1994 |
| DE | 9413805 U1 | 11/1994 |
| DE | 197 50 069 | 5/1999 |
| DE | 100 15 711 | 10/2001 |
| EP | 0305822 A | 3/1989 |
| EP | 0 314 318 B1 | 5/1989 |
| EP | 0 501 701 A2 | 9/1992 |
| EP | 0 503 264 A1 | 9/1992 |
| EP | 0 570 703 B1 | 11/1993 |
| EP | 0 574 619 A1 | 12/1993 |
| FR | 2 153 702 | 4/1973 |
| FR | 2 472 274 | 6/1981 |
| FR | 2 732 513 | 10/1996 |
| FR | 2732513 A | 10/1996 |
| FR | 2732513 A1 * | 10/1996 |
| GB | 913125 | 12/1962 |
| GB | 1 321 279 | 6/1973 |
| GB | 1 393 533 | 5/1975 |
| GB | 1 599 755 | 10/1981 |
| JP | 60-017856 | 1/1985 |

* cited by examiner

RECHARGEABLE BATTERY WITH FLEXIBLY CONNECTED VENT PLUGS

CROSS-REFERENCE TO RELATED PATENT APPLICATIONS

The present application claims the benefit of German Priority Application DE 10 2005 017 442.6-45, filed Apr. 15, 2005, the disclosure of which (including the specification, drawings, claims and abstract) is incorporated herein by reference in its entirety.

BACKGROUND

The present invention relates to batteries such as lead-acid rechargeable batteries. More specifically; the present invention relates to covers for use with such batteries.

By way of example, rechargeable batteries are known for use as starter batteries for passenger vehicles, and have electrochemical cells arranged in a row adjacent to one another. A filling and monitoring opening is provided above each cell in the cover, through which the battery liquid level can be monitored, and can be replenished if necessary. The openings are sealed in a liquid-tight and gas-tight manner by means of suitable plugs.

Screw-type plugs and plug-in-type plugs have been proven in practice. However, they have the disadvantage that they can be processed only with a large amount of effort. Screw-type plugs must be screwed individually into each filling and monitoring opening, thus increasing the amount of effort involved and in consequence the production costs for the rechargeable batteries.

In the case of plug-in-type plugs, it is admittedly possible to connect a plurality of plugs to one another and to close a plurality of filling and monitoring openings at the same time in one process. However, this requires very accurate adjustment of the plugs over the filling and monitoring openings, and tool alignment. Very minor manufacturing tolerances in the distances between the openings or the connected plugs lead to tilting of individual plugs and to leaks. Since rechargeable batteries are filled with acid, for example sulfuric acid in the case of a lead-acid rechargeable battery, and produce explosive gas mixtures, leaks lead to a risk of explosion and to considerable health hazards to people who have anything to do with rechargeable batteries. Tilting of the plugs can be avoided if the distance between adjacent plugs is designed to be flexible, thus allowing it to be matched to the distance between the openings. A plug strip such as this is disclosed in FR 2 732 513 A1. However, the length compensation takes place only longitudinally with respect to a line which connects the center axes of the plugs, and restricts the flexibility for insertion of the plugs into the filling openings.

There is thus a need to provide a rechargeable battery having an improved design that may be manufactured more simply and at less cost as compared to rechargeable batteries using known arrangements.

SUMMARY

An exemplary embodiment of the invention relates to a rechargeable battery that includes a housing, a plurality of cells within the housing, and a cover which closes the housing. The battery also includes a plurality of filling openings arranged in the cover separated from one another by a distance and a plurality of plugs. Each of the plurality of plugs is configured to close one of the plurality of filling openings. A flexible connecting element connects at least two of the plugs. The flexible connecting element is configured such that the distance between the plugs which are connected to one another can be variably matched to the distance between their associated filling openings by rotating at least one of the plugs connected by the flexible connecting element.

Another exemplary embodiment of the invention relates to a rechargeable battery that includes a housing, a plurality of cells, and a cover which closes the housing, the cover comprising a lower part provided on the housing and an upper part arranged at a distance from the lower part, the upper part closing the lower part to form a seal. The battery also includes a plurality of filling openings provided in the cover and separated from one another, a channel system provided between the lower part and the upper part, and at least one degassing opening provided in communication with the channel system. An ignition protection element is provided in the degassing opening, and a holding cap is provided for securing the ignition protection element in place, the holding cap articulated integrally on the cover.

Another exemplary embodiment of the invention relates to a cover for closing a rechargeable battery housing which has a plurality of cells. The cover includes a lower part which is provided on the housing and an upper part provided a distance from the lower part, the upper part closing the lower part to form a seal. The cover also includes a plurality of filling openings and a plurality of plugs for sealing the filling openings. At least two of the plugs are connected to one another by means of a flexible connecting element. The flexible connecting element is configured such that a distance between the plugs which are connected to one another can be variably matched to a distance between associated filling openings by rotating at least one of the plugs.

BRIEF DESCRIPTION OF THE DRAWINGS

The invention will be explained in more detail in the following text with reference to the attached drawings, in which.

DETAILED DESCRIPTION

According to an exemplary embodiment, an improved battery (e.g., a lead-acid rechargeable battery) is provided that may be manufactured more easily and at lower cost as compared to known battery arrangements. The battery includes a housing which has a plurality of cells, a cover which closes the housing, a plurality of filling and monitoring openings which are arranged in the cover and separated from one another and can be closed by means of a plug connection by associated plugs, of which at least two are connected to one another by means of a flexible connecting element.

According to an exemplary embodiment, the design of the flexible connecting elements allows the distance between the plugs which are connected to one another to be variably matched to the distance between the associated filling openings by rotation of at least one of these plugs.

It is thus proposed that the filling openings in the cover of the rechargeable battery housing should not be closed individually by plugs once the battery liquid has been introduced, but that a plurality of filling openings should be closed in one production step. For this purpose, a plurality of plugs are connected to one another by means of suitable connecting elements before the closure of the filling openings. The connection is provided in such a way that the plugs are in a relative position with respect to one another which corresponds to the arrangement of the plugs for closure purposes. This makes it possible to place a plurality of plugs on the corresponding filling openings, and to close them, in one production step.

In order to close the filling openings in a liquid-tight and gas-tight manner, it is necessary for the plugs to be inserted with an accurate fit into the associated filling openings, and for these filling openings to be sealed by suitable means. If the distances between the plugs which are connected to one another are slightly too great or too little, because of manufacturing tolerances, the plugs would be tilted during insertion into the filling openings if they were rigidly linked. This can lead, on the one hand, to damage to the plugs or filling openings and thus to increased scrap during production of the rechargeable batteries. On the other hand, there is a risk of the plugs not correctly closing the filling openings, and of rechargeable battery liquid or gases being able to emerge from the rechargeable battery. This not only shortens the life of the rechargeable battery but also results in considerable health hazards to people who come into contact with rechargeable batteries. For example, a conventional lead-acid rechargeable battery is filled with sulfuric acid, which can lead to burning of the skin.

In order to prevent the plugs from being tilted during insertion into the filling openings, the connections between the plugs are designed such that the relative distances between the plugs which are connected to one another can be varied by rotation of at least one of these plugs about an axis parallel to the center axes during insertion. Relative rotation of the plugs with respect to one another makes it possible both to increase and to decrease the distance between them. This means that the plugs are always held at the correct distance from one another during insertion into the filling openings, and can correctly close the filling openings. The rotary movement of the plugs additionally makes it easier to insert the plugs into the filling openings.

In the case of the proposed rechargeable battery, a plurality of openings can thus be closed at the same time in one production step, while maintaining good sealing characteristics. This allows economic and low-cost production of the rechargeable battery.

At least one trough for flush holding of the plugs and connecting elements can be provided in the area of the plugs on the surface of the cover. The contour of the at least one trough expediently corresponds to the contour of the plugs and connecting elements to be held in the trough. This allows the cover to have a flat surface, without unnecessary edges.

In one particular embodiment, the connecting element has webs which in each case connect two cover plates of the plugs and are formed integrally with the plugs, with the webs being inclined at an angle to an imaginary alignment line which intersects the center axes of the plugs which are connected to one another.

One filling opening is expediently provided for each cell. The filling openings can preferably be closed in a liquid-tight and gas-tight manner by means of the plugs. The sealing process can be simplified by the filling openings tapering inward.

In one embodiment, the cover has a lower part, which is placed on the housing, and an upper part, which is arranged at a distance from the lower part and closes the lower part forming a seal, in addition, a channel system for acid deposition is formed between the lower part and the upper part. The channel system is expediently connected to a degassing opening, which is provided with ignition protection. The degassing opening is preferably provided with a diffuser plate, which may also be in the form of ignition protection.

The diffuser plate is preferably hydrophobized. This prevents air humidity from entering the rechargeable battery from the outside.

According to another exemplary embodiment, a rechargeable battery, in particular a lead-acid rechargeable battery, includes a housing which has a plurality of cells, and having a cover which closes the housing, with the cover having a lower part, which is placed on the housing, and an upper part, which is arranged at a distance from the lower part and closes the lower part forming a seal, and with a channel system for acid deposition being formed between the lower part and the upper part, and with a plurality of filling and/or reverse-flow openings, which are arranged in the cover and are separated from one another, as well as at least one degassing opening, which is provided with an ignition protection element, being connected in a communicating manner to the channel system, in that a holding cap is articulated integrally on the cover, has a degassing opening and can be clamped into an opening in the channel system, for the ignition protection element. The holding cap which is articulated on the cover makes it easier to fit the ignition protection element to the rechargeable battery, and thus to produce it. Furthermore, the ignition protection element can be replaced, for example if it is damaged, without any intervention in the rechargeable battery.

According to another exemplary embodiment, a cover is provided for closing a rechargeable battery housing which has a plurality of cells having a lower part, which is placed on the housing, an upper part, which is arranged at a distance from the lower part and closes the lower part forming a seal, as well as a plurality of filling openings which can be closed by means of a plug connection by means of associated plugs, of which at least two are connected to one another by means of a flexible connecting element, in that the flexible connecting elements are in each case designed such that the distance between the plugs which are connected to one another can be variably matched to the distance between the associated filling openings by rotation of at least one of these plugs.

Figure 1:
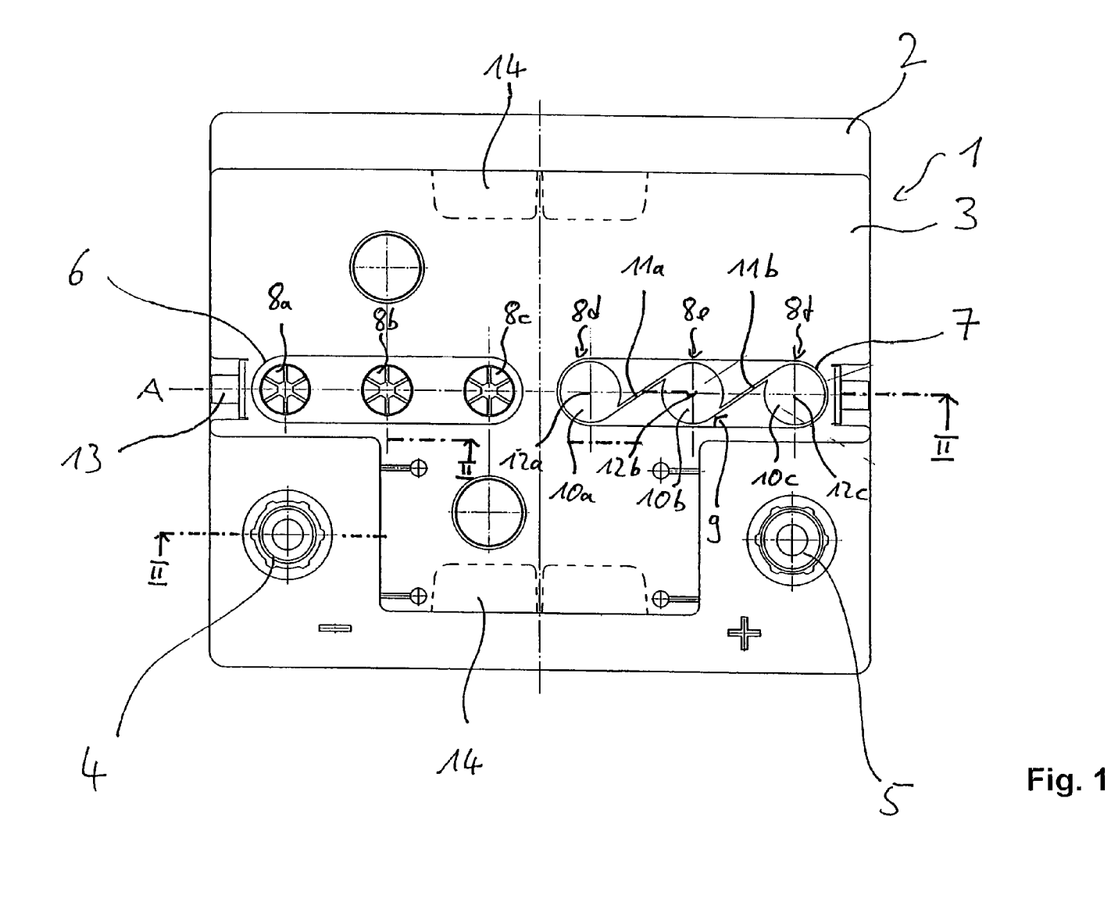
FIG. 1 shows a plan view of a rechargeable battery.

FIG. 1 shows a rechargeable battery which has a plastic housing in which six cells are arranged in one row. The housing is closed by a cover 1, which comprises a lower part 2 and an upper part 3 placed on it. The rechargeable battery has a negative pole 4 and a positive pole 5. Two troughs 6 and 7 with a cross section in the form of elongated holes are provided in the upper part 3 of the cover 1. One filling opening 8a, 8b, 8c, 8d, 8e and 8f leads to each respective cell in the rechargeable battery. The filling openings 8 are arranged along the longitudinal center line of the cover A, in one row. Three filling openings 8a, 8b and 8c are open. The three filling openings 8d, 8e and 8e are closed by means of the plug-in-type plug strip 9. The plug-in-type plug strip 9 comprises the three plug-in-type plugs 10a, 10b and 10c. The plug-in-type plugs 10a, 10b and 10c are connected to one another in one row by means of the connecting elements 11a and 11b. The connecting elements 11a and 11b each extend tangentially and at an angle to the line A between two adjacent plug-in-type plugs 10a and 10b, as well as 10b and 10c, respectively. This connection running at an angle allows the centers 12a, 12b and 12c of the plug-in-type plugs 10 to be moved relative to one another during insertion onto the filling openings 8d, 8e and 8f, and results in center tolerance compensation, so that the plug-in-type plugs 10 are not tilted in the filling openings 8d, 8e and 8f.

The filling openings 8 are connected to one another by means of a channel system 13, which is used as a degassing and acid separation system. The individual cells are connected such that they can communicate with one another through this channel system 13.

Figure 2:
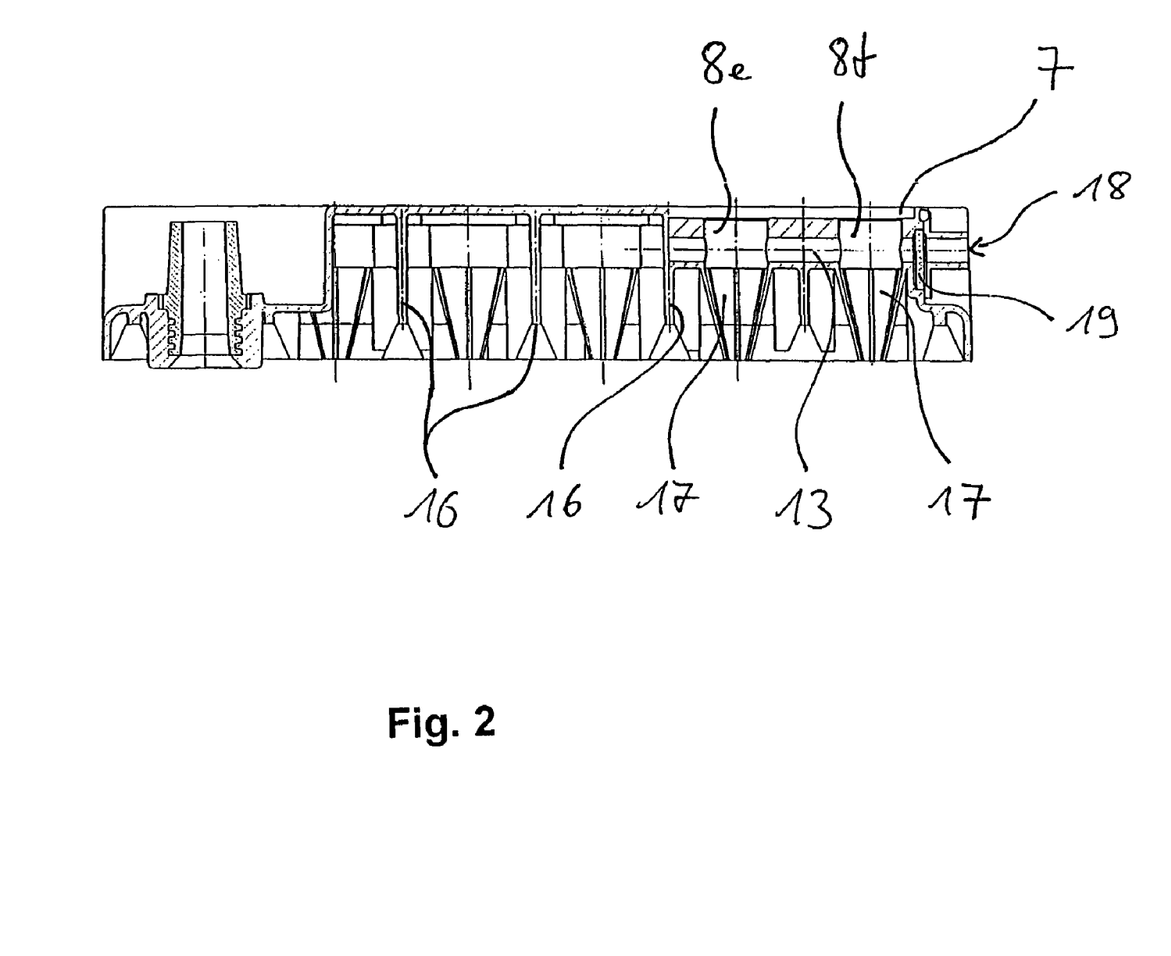
FIG. 2 shows the section II from FIG. 1.

As can be seen from FIG. 2, the cells are separated from one another in a liquid-tight manner by means of cell separating walls 16. The filling openings 8, which lead into the cells, are provided with integrated splash protection 17. The channel system 13 leads to the exterior via a degassing opening 18. The degassing opening 18 is provided with a hydrophobized diffuser plate, as a flame protection filter.

Figure 3:
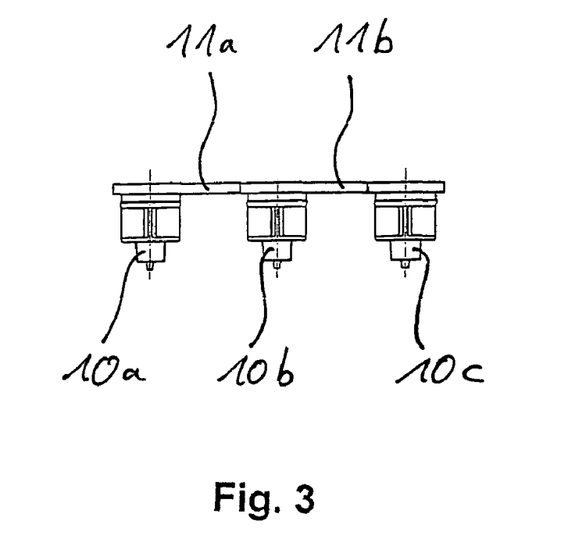
FIG. 3 shows a main view of a plug-in-type plug strip.
Figure 4:
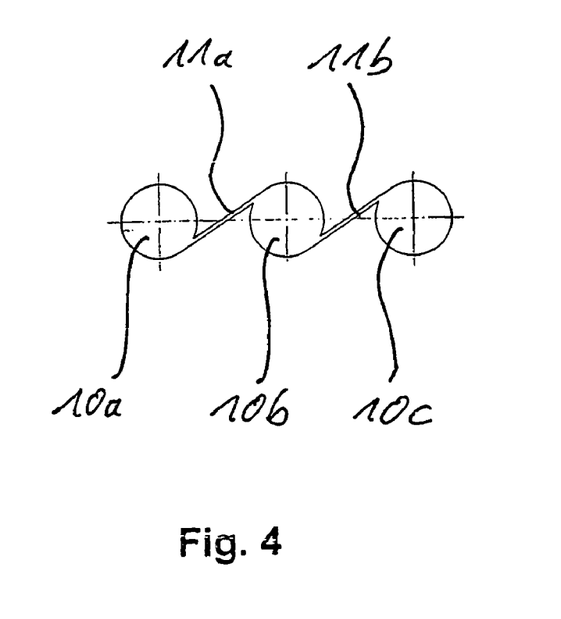
FIG. 4 shows a plan view of the plug-in-type plug strip shown in FIG. 3.

FIG. 3 shows three plugs 10, which are connected to one another by means of the connecting elements 11. The plugs 10 each have a plug head. The height of this plug head corresponds approximately to the depth of the troughs 6 and 7. The connecting elements 11 are also of the same height. This means that the plug-in-type plug strip 9 is recessed in the upper part 3 of the cover 1 after insertion in the filling openings 8, and a smooth surface is formed.

Figure 5:
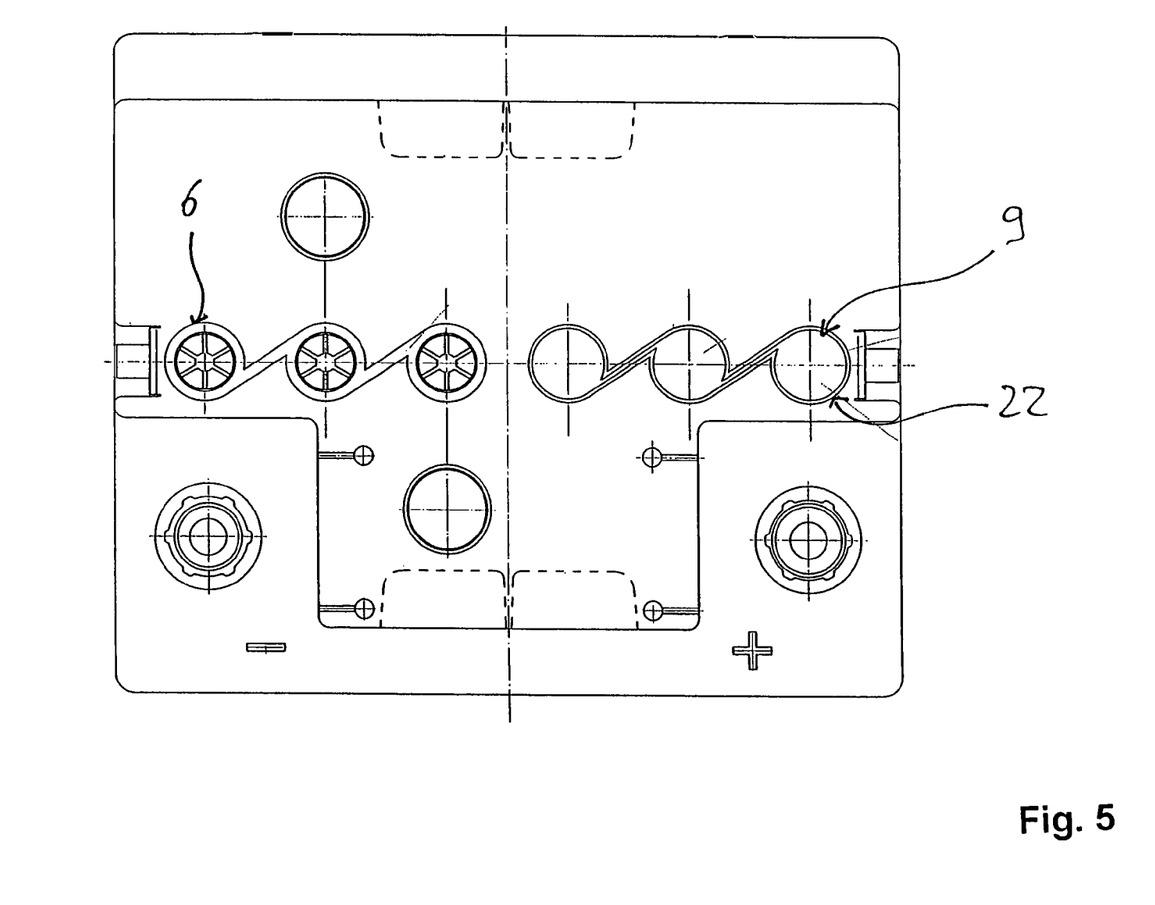
FIG. 5 shows a plan view of a further rechargeable battery.

FIG. 5 shows a rechargeable battery in which the troughs 21 and 22 in the upper part 3 are designed to match the shape of the outline of the plug-in-type plug strip. This makes it possible to achieve an even flatter rechargeable battery surface.

Figure 6:
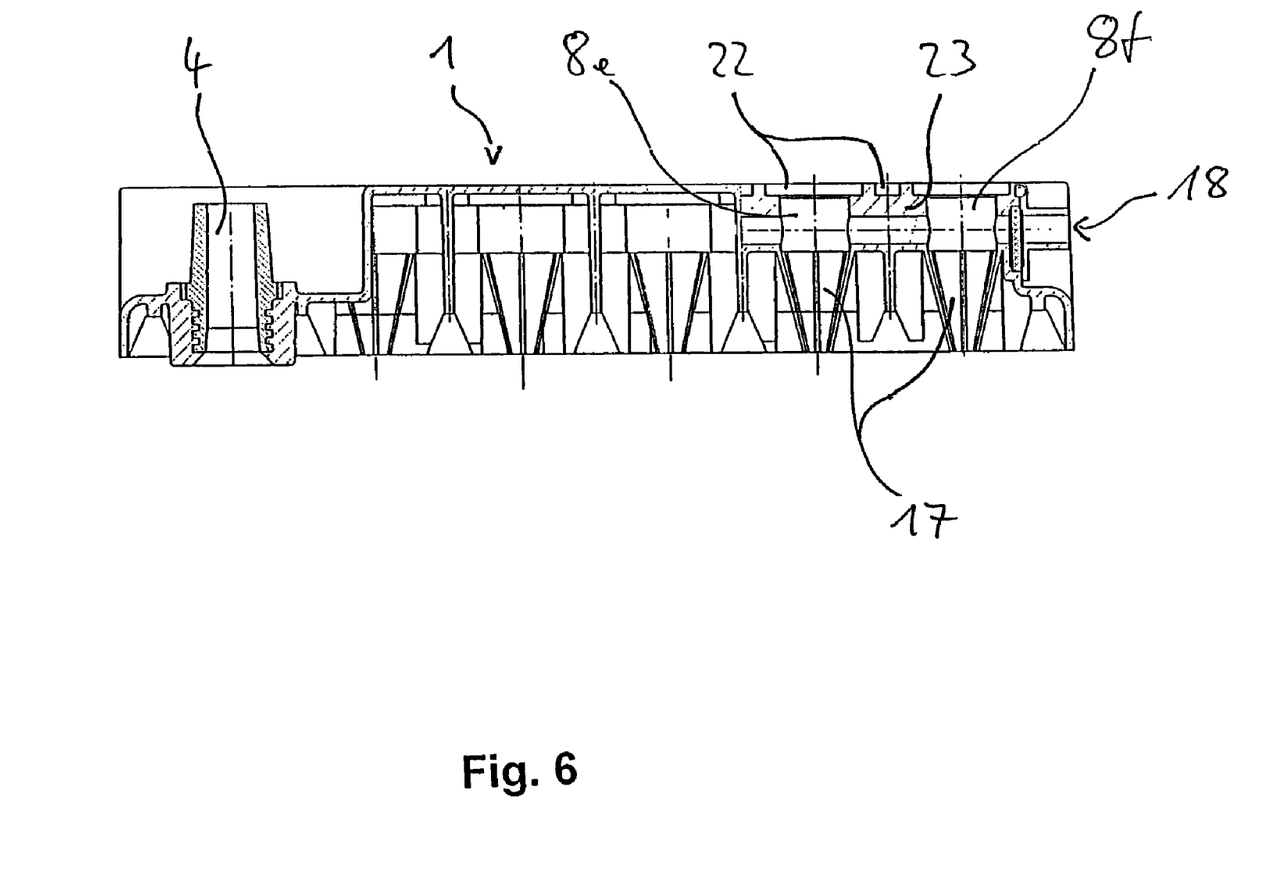
FIG. 6 shows the section VI from FIG. 5.

As can be seen from FIG. 6, the filling openings 8 are each provided with splash protection 17. A trough 22 is provided in the area of the filling openings 8 in the upper part 23 of the cover 1, and its contour corresponds to the contour of the plug heads and connecting elements 11 to be held in the trough. The connecting elements are webs which are aligned at an angle to an imaginary alignment line, which intersects the center axes at the centers 12 of the plug-in-type plugs 10 which are connected to one another.

Figure 7:
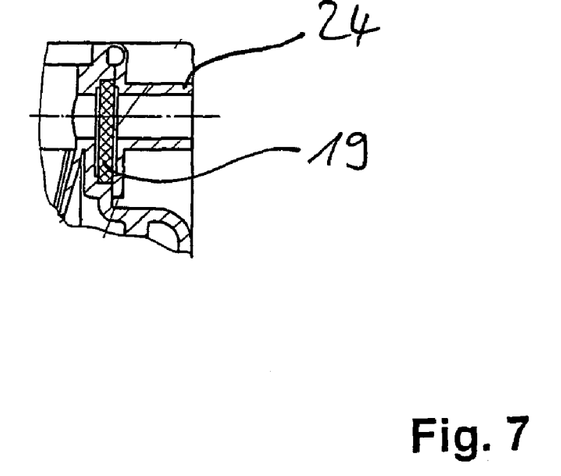
FIG. 7 shows a part of the section VI from FIG. 5.

FIG. 7 shows an enlarged illustration of the degassing opening 18 with the ignition protection element 19 inserted.

Figure 8:
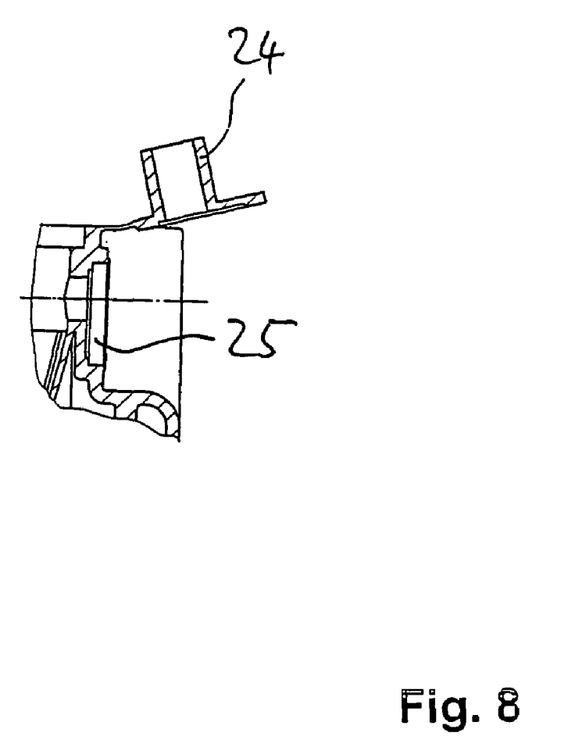
FIG. 8 shows a section through the degassing opening from FIG. 7, before the insertion of a flame protection filter.

FIG. 8 shows the degassing opening 18 before the insertion of the ignition protection element 19. In order to make it easier to insert the ignition protection element 19, the degassing opening 18 has a folding holding flap 24. Once the ignition protection element 19 has been inserted into the filter holder 25, the holding flap 24 is folded down, and is locked by suitable means, for example by welding or adhesive bonding.

It is important to note that the construction and arrangement of the rechargeable battery as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A rechargeable battery comprising:
   a housing;
   a plurality of cells within the housing;
   a cover which closes the housing;
   a plurality of filling openings arranged in the cover separated from one another by a distance;
   a plurality of plugs, each of the plurality of plugs configured to close one of the plurality of filling openings;
   a flexible connecting element connecting at least two of the plugs;
   wherein the flexible connecting element is generally straight in a plane parallel to the top of the battery; and
   wherein the flexible connecting element does not connect to the plugs at a location on the plug that is on an imaginary alignment line which intersects the center axes of the plugs which are connected to one another in a view on the top of the battery; and
   wherein the flexible connecting element is configured such that the distance between the plugs which are connected to one another can be variably matched to the distance between their associated filling openings by rotating at least one of the plugs connected by the flexible connecting element.

2. The rechargeable battery of claim 1, wherein the cover comprises an upper face, and further comprising at least one trough provided in the area of the plugs on the upper face of the cover for flush holding of the plugs and flexible connecting elements.

3. The rechargeable battery of claim 2, wherein the contour of the at least one trough corresponds to the contour of the plugs and flexible connecting elements.

4. A rechargeable battery, comprising:
   a housing;
   a plurality of cells within the housing;
   a cover which closes the housing;
   a plurality of filling openings arranged in the cover separated from one another by a distance;
   a plurality of plugs, each of the plurality of plugs configured to close one of the plurality of filling openings; and
   a flexible connecting element connecting at least two of the plugs;
   wherein the flexible connecting element has webs which in each case connect two cover plates of the plugs and are formed integrally with the plugs, with the webs being inclined at a non-right angle in a view on the top of the battery to an imaginary alignment line which intersects the center axes of the plugs which are connected to one another; and
   wherein the flexible connecting element is configured such that the distance between the plugs which are connected to one another can be variably matched to the distance between their associated filling openings by rotating at least one of the plugs connected by the flexible connecting element.

5. The rechargeable battery of claim 1, wherein the plugs are configured to close the filling openings in a liquid-tight and gas-tight manner.

6. The rechargeable battery of claim 1, wherein the filling openings taper inward.

7. The rechargeable battery of claim 1, wherein one filling and monitoring opening is provided for each cell.

8. The rechargeable battery of claim 1, wherein the cover has a lower part which is placed on the housing and an upper part which is arranged at a distance from the lower part and closes the lower part to form a seal and a channel system for acid deposition between the lower part and the upper part.

9. The rechargeable battery of claim 8, further comprising at least one degassing opening which is provided with ignition protection and is connected to the channel system.

10. The rechargeable battery of claim 9, further comprising a holding cap which is integrally articulated on the cover and has a degassing opening for ignition protection.

* * * * *